United States Patent
Masunaga et al.

(10) Patent No.: US 11,948,741 B2
(45) Date of Patent: Apr. 2, 2024

(54) ELECTROLYTE SOLUTION FOR ELECTROCHEMICAL DEVICE, AND ELECTROCHEMICAL DEVICE

(71) Applicant: Panasonic Intellectual Property Management Co., Ltd., Osaka (JP)

(72) Inventors: Keisuke Masunaga, Tokyo (JP); Hideo Sakata, Osaka (JP); Nao Miyaguchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 2 days.

(21) Appl. No.: 17/998,270

(22) PCT Filed: May 18, 2021

(86) PCT No.: PCT/JP2021/018827
§ 371 (c)(1),
(2) Date: Nov. 9, 2022

(87) PCT Pub. No.: WO2021/241333
PCT Pub. Date: Dec. 2, 2021

(65) Prior Publication Data
US 2023/0230777 A1 Jul. 20, 2023

(30) Foreign Application Priority Data

May 26, 2020 (JP) .................... 2020-091693

(51) Int. Cl.
*H01G 11/64* (2013.01)
*H01G 11/28* (2013.01)
*H01G 11/34* (2013.01)
*H01G 11/62* (2013.01)

(52) U.S. Cl.
CPC ............ *H01G 11/64* (2013.01); *H01G 11/28* (2013.01); *H01G 11/34* (2013.01); *H01G 11/62* (2013.01)

(58) Field of Classification Search
None
See application file for complete search history.

(56) References Cited

U.S. PATENT DOCUMENTS

| | | | | |
|---|---|---|---|---|
| 2006/0092597 A1* | 5/2006 | Takeda | ................. | H01G 9/035 361/503 |
| 2007/0002522 A1* | 1/2007 | Takeda | ................. | H01G 11/62 361/502 |
| 2014/0134501 A1* | 5/2014 | Li | ................. | H01M 10/052 429/188 |

(Continued)

FOREIGN PATENT DOCUMENTS

| | | |
|---|---|---|
| JP | 2015-088632 | 5/2015 |
| JP | 2015195191 A * | 11/2015 |

(Continued)

OTHER PUBLICATIONS

International Search Report of PCT application No. PCT/JP2021/018827 dated Aug. 17, 2021.

*Primary Examiner* — Dion R. Ferguson
(74) *Attorney, Agent, or Firm* — Rimon P.C.

(57) ABSTRACT

An electrolytic solution for an electrochemical device a solvent, an ionic substance, and an additive agent, the additive agent containing α-methyl-γ-butyrolactone and δ-valerolactone.

8 Claims, 1 Drawing Sheet

(56) References Cited

U.S. PATENT DOCUMENTS

| | | | | |
|---|---|---|---|---|
| 2015/0116907 A1* | 4/2015 | Ito | ............................ | H01G 11/58 |
| | | | | 361/502 |
| 2015/0140446 A1* | 5/2015 | Li | ........................ | H01M 10/052 |
| | | | | 429/199 |
| 2019/0273284 A1* | 9/2019 | Nakagawa | .............. | H01G 11/62 |
| 2023/0230777 A1* | 7/2023 | Masunaga | .............. | H01G 11/32 |
| | | | | 361/502 |

FOREIGN PATENT DOCUMENTS

| | | | | |
|---|---|---|---|---|
| JP | 2016024918 A | * | 2/2016 | |
| JP | 6357639 B | | 7/2018 | |
| KR | 20170033437 A | * | 3/2017 | |

\* cited by examiner

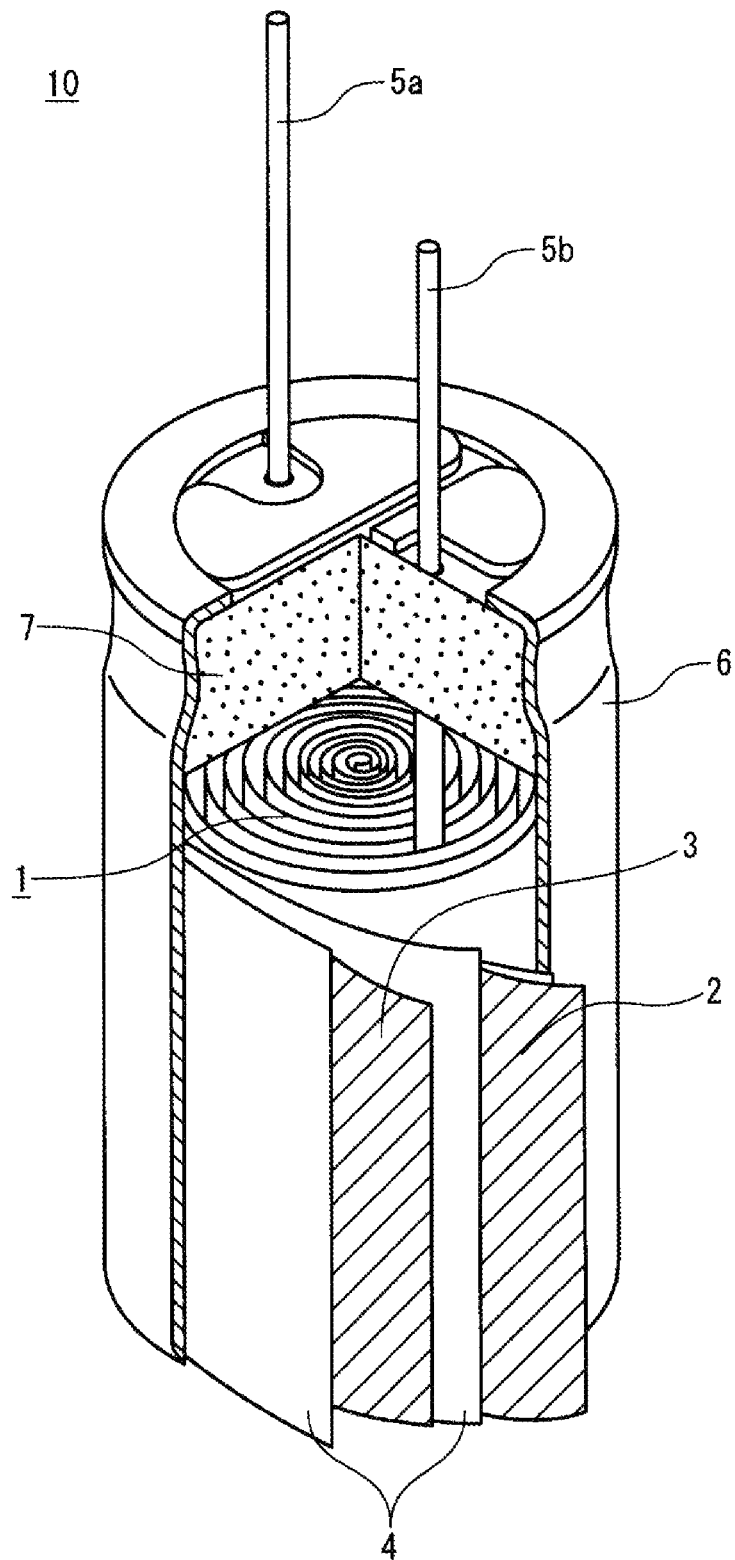

ELECTROLYTE SOLUTION FOR ELECTROCHEMICAL DEVICE, AND ELECTROCHEMICAL DEVICE

CROSS-REFERENCE TO RELATED APPLICATIONS

This application is a U.S. national stage application of the PCT International Application No. PCT/JP2021/018827 filed on May 18, 2021, which claims the benefit of foreign priority of Japanese patent application No. 2020-091693 filed on May 26, 2020, the contents all of which are incorporated herein by reference.

TECHNICAL FIELD

The present invention relates to an electrolytic solution for an electrochemical device and an electrochemical device.

BACKGROUND

The electrochemical device includes a positive electrode, a negative electrode, and an electrolytic solution. An electric double layer capacitor, which is an example of an electrochemical device, has a longer life than a secondary battery, can be rapidly charged, has excellent output characteristics, and is widely used as a backup power supply or the like.

The electrolytic solution contains a solvent and an ionic substance. For example, in order to improve the heat resistance of the electrolytic solution, γ-butyrolactone is used for a solvent of the electrolytic solution (for example, Japanese Patent No. 6357639).

SUMMARY

During charge of the electrochemical device, the solvent in the electrolytic solution comes into contact with the negative electrode active material to be reduced and decomposed, and the electrolytic solution may be deteriorated. The performance of the electrochemical device may be deteriorated with deterioration of the electrolytic solution.

In view of the above, one aspect of the present invention relates to an electrolytic solution for an electrochemical device, the electrolytic solution containing: a solvent; an ionic substance; and an additive agent. The additive agent contains α-methyl-γ-butyrolactone and δ-valerolactone.

Another aspect of the present invention relates to an electrochemical device including: a pair of electrodes; and the electrolytic solution for an electrochemical device.

According to the present invention, deterioration of performance of an electrochemical device due to decomposition and deterioration of an electrolytic solution during charge is suppressed.

BRIEF DESCRIPTION OF THE DRAWINGS

FIG. 1 is a partially cutout perspective view illustrating an electrochemical device according to an exemplary embodiment of the present invention.

DESCRIPTION OF EMBODIMENT

[Electrolytic Solution for Electrochemical Device]

An electrolytic solution for an electrochemical device according to an exemplary embodiment of the present invention contains a solvent, an ionic substance, and an additive agent. The additive agent contains α-methyl-γ-butyrolactone (hereinafter, referred to as AMGBL) and δ-valerolactone (hereinafter, referred to as DVL).

Containing AMGBL and DVL in the electrolytic solution allows a high-quality coating film derived from AMGBL and DVL to be formed on the surface of the negative electrode active material during charge. During charge, the formation of the coating film is preferentially performed on the negative electrode rather than reductive decomposition of the solvent of γ-butyrolactone or the like. When the coating film is preferentially formed, reductive decomposition of the solvent in the electrolytic solution due to contact with the negative electrode active material is suppressed. As a result, deterioration in performance of the electrochemical device associated with the decomposition is suppressed. For example, a decrease in capacitance and an increase in internal resistance of the electrochemical device are suppressed.

When AMGBL and DVL are used in combination, reductive decomposition of the solvent in the electrolytic solution during charge is greatly suppressed. Although the detailed reason is unknown, it is presumed that a thin and dense coating film is formed by, for example, the interaction between AMGBL and DVL. For example, a sparse coating film derived from AMGBL is formed on the surface of the negative electrode active material due to the influence of the methyl group of AMGBL. In addition, a coating film derived from DVL, which is reduced and decomposed at a different voltage from that of AMGBL, is formed stepwise. At this time, it is presumed that the sparse portion of the coating film derived from AMGBL is easily supplemented by the coating film derived from DVL. Coating films derived from AMGBL and DVL have low resistance. Therefore, an electrochemical device having a small internal resistance and a large capacitance can be obtained.

From the viewpoint of suppressing decomposition of the solvent in the electrolytic solution during charge, the total content proportion (proportion in the entire electrolytic solution on a mass basis) of AMGBL and DVL in the electrolytic solution may be less than or equal to 3.5 mass %, or may range from 0.1 mass % to 3.5 mass %, inclusive, from 0.1 mass % to 3.1 mass %, inclusive, from 0.1 mass % to 1.5 mass %, inclusive, or from 0.15 mass % to 1.5 mass %, inclusive.

When the total content proportion of AMGBL and DVL in the electrolytic solution is less than or equal to 3.1 mass %, the coating films derived from AMGBL and DVL are easily formed with an appropriate thickness on the surface of the negative electrode active material, the resistance of the negative electrode is easily reduced, and a decrease in capacitance due to an increase in the resistance of the negative electrode is easily suppressed. When the total content proportion of AMGBL and DVL in the electrolytic solution is more than or equal to 0.1 mass %, the effect of suppressing decomposition of the solvent in the electrolytic solution during charge is easily obtained.

From the viewpoint of suppressing a decrease in capacitance associated with decomposition and deterioration of the electrolytic solution during charge, the content proportion of AMGBL in the electrolytic solution may range from 0.01 mass % to 3.5 mass %, inclusive, from 0.05 mass % to 3 mass %, inclusive, from 0.05 mass % to 1 mass %, inclusive, or from 0.05 mass % to 0.5 mass %, inclusive. From the same viewpoint as described above, the content proportion of DVL in the electrolytic solution may range from 0.01 mass % to 3.5 mass %, inclusive, from 0.05 mass % to 3 mass %, inclusive, from 0.05 mass % to 1 mass %, inclusive, or from 0.05 mass % to 0.5 mass %, inclusive.

In the electrolytic solution, the mass ratio of DVL to AMGBL: (DVL/AMGBL) may range from 0.03 to 70, inclusive, from 0.03 to 60, inclusive, or from 0.1 to 10, inclusive.

In the preparation of the electrolytic solution (before the initial charge of the electrochemical device), the content proportions of AMGBL and DVL in the electrolytic solution and the total content proportion thereof may be within the above ranges. During charge of the electrochemical device, a part of AMGBL and DVL in the electrolytic solution may be consumed to form the coating film on the surface of the negative electrode active material. After the initial charge of the electrochemical device, the content proportions of AMGBL and DVL in the electrolytic solution and the total content proportion thereof may be less than the above range, for example, may be a trace amount close to the detection limit. When AMGBL and DVL are present in the electrolytic solution in the electrochemical device, the effect of improving the performance of the electrochemical device according to the presence is obtained. The content proportions of AMGBL and DVL in the electrolytic solution and the total content proportion thereof are determined by gas chromatography mass spectrometry (GC/MS) or the like.

As the solvent contained in the electrolytic solution, for example, a non-aqueous solvent is used. Examples of the non-aqueous solvent include cyclic carbonate compounds, lactone compounds other than AMGBL and DVL, sulfoxide compounds, sulfone compounds, amide compounds, chain carbonate compounds, chain ether compounds, cyclic ether compounds, and chain carboxylic acid ester compounds. The non-aqueous solvent may be used alone or in combination of more than or equal to two types thereof.

From the viewpoint of improving the electrical conductivity of the electrolytic solution, the non-aqueous solvent may contain at least one solvent having a high relative dielectric constant selected from the group consisting of cyclic carbonate compounds, lactone compounds, sulfoxide compounds, sulfone compounds, and amide compounds.

From the viewpoint of improving ion mobility in the electrolytic solution, the non-aqueous solvent may contain at least one solvent having a low viscosity selected from the group consisting of chain carbonate compounds, chain ether compounds, cyclic ether compounds, and chain carboxylic acid ester compounds.

Examples of the cyclic carbonate compound include ethylene carbonate, 1,2-propylene carbonate, 1,3-propylene carbonate (PC), 1,2-butylene carbonate, 1,3-butylene carbonate, and fluoroethylene carbonate. Examples of the chain carbonate compound include dimethyl carbonate, ethyl methyl carbonate, and diethyl carbonate.

Examples of the lactone compound other than AMGBL and DVL include γ-butyrolactone (GBL), γ-valerolactone, γ-caprolactone, δ-hexanolactone, and δ-octanolactone. Examples of the nitrile compound include acetonitrile (AN) and propionitrile. Examples of the amide compound includes N-methylacetamide, N,N-dimethylacetamide, N,N-dimethylformamide, and N-methyl-2-pyrrolidone.

Examples of the sulfoxide compound include dimethyl sulfoxide, diethyl sulfoxide, diphenyl sulfoxide, and thiophene. Examples of the sulfone compound includes methyl sulfone, diethyl sulfone, diphenyl sulfone, sulfolane, 3-methylsulfolane, 2,4-dimethyl sulfolane, sulfolene, 3-methyl sulfolene, and 3-ethyl sulfolene.

Examples of the cyclic ether compound include tetrahydrofuran, 1,3-dioxolane, and 1,4-dioxane. Examples of the chain ether compound include 1,2-dimethoxyethane, ethoxymethoxyethane, 1,2-diethoxyethane, ethylene glycol bis(trifluoroethyl)ether, and ethylene glycol bis(trifluoromethyl)ether.

The chain carboxylic acid ester compound includes methyl formate, ethyl formate, methyl acetate, ethyl acetate, methyl propionate, and ethyl propionate. As the non-aqueous solvent, a polyhydric alcohol compound such as ethylene glycol or propylene glycol, a ketone compound such as methyl ethyl ketone, formaldehyde, or the like may be used.

Among them, the solvent preferably contains at least one selected from the group consisting of GBL, AN, and PC, and more preferably contains GBL. In this case, coating films derived from AMGBL and DVL are likely to be preferentially formed during charge, and the effect provided by containing AMGBL and DVL in the electrolytic solution is remarkably obtained. Although the detailed reason is unknown, in the case of GBL, such an effect is presumably influenced by the fact that GBL is a lactone like AMGBL and DVL. In addition, GBL is excellent in chemical stability and thermal stability. AN has a low viscosity, and thus is advantageous in terms of improving the mobility of ions in the electrolytic solution.

The proportion of GBL in the solvent is preferably more than or equal to 80 vol %, and more preferably more than or equal to 90 vol %. The proportion of AN in the solvent is preferably more than or equal to 80 vol %, and more preferably more than or equal to 90 vol %. The proportion of PC in the solvent is preferably more than or equal to 70 vol %, and more preferably more than or equal to 90 vol %.

The solvent may be a mixed solvent of AN and PC. In this case, the proportion of AN in the mixed solvent (the total of AN and PC) ranges preferably from 80 vol % to 95 vol %, inclusive. The solvent may be a mixed solvent of GBL and PC. In this case, the proportion of GBL in the mixed solvent (the total of GBL and PC) ranges preferably from 80 vol % to 95 vol %, inclusive. The solvent may be a mixed solvent of AN and GBL. In this case, the proportion of AN in the mixed solvent (the total of AN and GBL) ranges preferably from 80 vol % to 95 vol %, inclusive. Among the above mixed solvents, a mixed solvent of AN and GBL is preferable from the viewpoint of suppressing an increase in internal resistance associated with decomposition and deterioration of the electrolytic solution during charge.

The ionic substance is dissolved in the solvent and contains a cation and an anion. The ionic substance may contain, for example, a low melting point compound (ionic liquid) that can exist as a liquid at around normal temperature. Each of the cation and the anion may be used alone or in combination of more than or equal to two types thereof.

Examples of the cation include organic cations such as a quaternary ammonium cation and a quaternary phosphonium cation. Examples of the quaternary ammonium cation include cations derived from an aliphatic amine, an alicyclic amine, or an aromatic amine. Specific examples of the quaternary ammonium cation include a diethyldimethylammonium (DEDMA) cation, a triethylmethylammonium (TEMA) cation, a tetraethylammonium (TEA) cation, a tetramethylammonium cation, a trimethylethylammonium cation, and a trimethylpropylammonium cation.

The quaternary ammonium cation may include cations derived from a cyclic amine (cations having a nitrogen-containing heterocyclic ring). Examples of such a cation include cations having a skeleton such as imidazole, pyridine, pyrrolidine, and piperidine.

Examples of the cation (imidazolium) having an imidazole skeleton include a 1,3-dimethylimidazolium cation, a 1-ethyl-3-methylimidazolium cation, a 1,3-diethylimidazolium cation, a 1,2,3-trimethylimidazolium cation, and a 1,2,3,4-tetramethylimidazolium cation. Examples of the cation (pyridinium) having a pyridine skeleton include a 1-methylpyridinium cation, a 1-ethylpyridinium cation, and a 1-butylpyridinium cation.

Examples of the cation (pyrrolidinium) having a pyrrolidine skeleton include a 1,1-dimethylpyrrolidinium cation, a 1-ethyl-1-methylpyrrolidinium cation, and a 1,1-diethylpyrrolidinium cation. Examples of the cation (piperidinium) having a piperidine skeleton include a 1,1-dimethylpiperidinium cation, a 1-ethyl-1-methylpiperidinium cation, and a 1,1-diethylpiperidinium cation.

The quaternary ammonium cation may include cations having a spiro skeleton whose spiro atom is a nitrogen atom (two rings are linked via one common nitrogen atom). Specific examples thereof include a spiro-(1,1')-bipyrrolidinium (SBP) cation and a spiro-(1,1')-bipiperidinium cation. The quaternary ammonium cation may include cations having a 1,4-diazabicyclo[2.2.2]octane (DABCO) skeleton. Specific examples thereof include an N-methyl-1,4-diazabicyclo[2.2.2]octane ammonium cation and the like.

Examples of the quaternary phosphonium cation include tetraalkylphosphonium cations. Examples of the tetraalkylphosphonium cation include a tetramethylphosphonium cation and a tetraethylphosphonium cation.

The cation may include inorganic cations such as a metal ion. Examples of the metal ion include alkali metal ions and alkaline earth metal ions. Examples of the alkali metal ion include a lithium ion, a sodium ion, and a potassium ion. Examples of the alkaline earth metal ion include a magnesium ion and a calcium ion.

Examples of the anion include inorganic anions such as $BF_4^-$, $PF_6^-$, $AsF_6^-$, $SbF_6^-$, $N(FSO_2)_2^-$, $F^-$, $Cl^-$, $Br^-$, $I^-$, $NO_3^-$, $NO_2^-$, $ClO_4^-$, $AlCl_4^-$, $AlF_4^-$, $TaF_6^-$, $NbF_6^-$, $SiF_6^-$, and $CN^-$. Among the inorganic anions, from the viewpoint that the withstand voltage characteristics are easily improved and the ionic conductivity is high, the anion preferably includes a fluorine-containing acid anion, more preferably includes $BF_4^-$ and/or $PF_6^-$, and still more preferably includes $BF_4^-$.

In addition, the anion may include organic anions such as $N(RfSO_3)_2^-$, $C(RfSO_2)_3^-$, $RfSO_3^-$, and $CH_3BF_3^-$. Rf is a fluoroalkyl group having 1 to 12 carbon atoms. Examples of Rf include a trifluoromethyl group ($CF_3$) and a pentafluoroethyl group ($C_2F_5$).

The ionic substance preferably contains a salt (organic salt) in which at least one of a cation and an anion contains an organic substance. From the viewpoint of improving the electrical conductivity of the electrolytic solution, the organic salt preferably includes a quaternary ammonium salt. The quaternary ammonium salt preferably contains a quaternary ammonium cation and a fluorine-containing acid anion (particularly, $BF_4^-$). Specific examples of such a quaternary ammonium salt include diethyldimethylammonium tetrafluoroborate ($DEDMABF_4$), triethylmethylammonium tetrafluoroborate ($TEMABF_4$), tetraethylammonium tetrafluoroborate ($TEABF_4$), spiro-(1,1')-bipyrrolidinium tetrafluoroborate ($SBPBF_4$), N-methyl-1,4-diazabicyclo[2.2.2]octane ammonium tetrafluoroborate, 1-ethyl-1-methylpyrrolidinium tetrafluoroborate ($EMPyBF_4$), and 1,1-dimethylpyrrolidinium tetrafluoroborate ($DMPyBF_4$). Among them, the quaternary ammonium salt is preferably $DEDMABF_4$, $EMPyBF_4$, and $DMPyBF_4$, and more preferably $DEDMABF_4$ and $EMPyBF_4$, from the viewpoint of excellent oxidation resistance, reduction resistance, and the like.

The concentration of the ionic substance in the electrolytic solution ranges, for example, from 0.5 mol/L to 2.0 mol/L, inclusive. When the concentration of the ionic substance in the electrolytic solution is within the above range, it is easy to obtain an electrochemical device having a large capacitance and a small internal resistance.

[Electrochemical Device]

An electrochemical device according to an exemplary embodiment of the present invention includes a pair of electrodes and an electrolytic solution, and the electrolytic solution is the above-described electrolytic solution for an electrochemical device. One of the pair of electrodes is a positive electrode, and the other of the pair of electrodes is a negative electrode. Examples of the electrochemical device include an electric double layer capacitor and a lithium ion capacitor.

At least one of the pair of electrodes may include an active layer, and a current collector that supports the active layer. The active layer contains an active material capable of adsorbing and desorbing ions, and contains a carbon material as the active material. When the electrochemical device is an electric double layer capacitor, both of the pair of electrodes (the positive electrode and the negative electrode) may include an active layer, and a current collector that supports the active layer. When the electrochemical device is a lithium ion capacitor, one (positive electrode) of the pair of electrodes may include an active layer, and a current collector that supports the active layer. In this case, a negative electrode used in a lithium ion secondary battery can be used as the other (negative electrode) of the pair of electrodes. The negative electrode used in the lithium ion secondary battery contains a negative electrode active material (for example, graphite) capable of absorbing and releasing lithium ions.

The active layer contains, as an essential component, a carbon material which is an active material, and may contain a binding agent, a conductive agent, and the like as optional components. As the carbon material, for example, activated carbon, carbon nanotubes, graphite, graphene, and the like are used. Among these materials, the carbon material is preferably activated carbon. Examples of the raw material of activated carbon include wood, coconut shell, pulp waste liquid, coal or coal-based pitch obtained through thermal decomposition of coal, heavy oil or petroleum-based pitch obtained through thermal decomposition of heavy oil, phenol resin, petroleum coke, and coal coke. The activated carbon is preferably subjected to an activation treatment.

As the binding agent, for example, a resin material such as polytetrafluoroethylene (PTFE), carboxymethyl cellulose (CMC), and styrene-butadiene rubber (SBR) are used. As the conductive agent, for example, carbon black such as acetylene black is used.

The electrode is obtained, for example, by applying a slurry containing a carbon material, a binding agent and/or a conductive agent, and a dispersion medium to a surface of a current collector, drying the coating film, followed by rolling, to thereby form an active layer. As the current collector, for example, a metal foil such as an aluminum foil is used.

It is preferable to interpose a separator between the pair of electrodes. The separator has ion permeability and has a role of physically separating the pair of electrodes to prevent a short circuit. As the separator, for example, a nonwoven fabric containing cellulose as a main component, a glass fiber mat, or a microporous film made of polyolefin such as polyethylene is used.

Hereinafter, an electrochemical device according to an exemplary embodiment of the present invention will be described with reference to FIG. 1. FIG. 1 is a partially cutout perspective view illustrating an electrochemical device according to an exemplary embodiment of the present invention. The present invention is not limited to the electrochemical device of FIG. 1.

Electrochemical device 10 in FIG. 1 is an electric double layer capacitor, and includes capacitor element 1 which is a wound capacitor element. Capacitor element 1 has a structure in which sheet-like first electrode 2 and sheet-like second electrode 3 are wound with separator 4 interposed therebetween. First electrode 2 and second electrode 3 have a first current collector and a second current collector made of metal, respectively, and a first active layer and a second active layer supported on surfaces of the first current collector and the second current collector, respectively, and exhibit capacitance by adsorbing and desorbing ions. For example, an aluminum foil is used as the current collector. The surface of the current collector may be roughened by a method such as etching. As separator 4, for example, a nonwoven fabric containing cellulose as a main component is used. First lead wire 5a and second lead wire 5b are connected as lead-out members to first electrode 2 and second electrode 3, respectively. Capacitor element 1 is housed in cylindrical outer case 6 together with an electrolytic solution (not shown). The material of outer case 6 may be, for example, metal such as aluminum, stainless steel, copper, iron, or brass. The opening of outer case 6 is sealed with sealing member 7. Lead wires 5a and 5b are led out to the outside to penetrate sealing member 7. For sealing member 7, for example, a rubber material such as butyl rubber is used.

In the above exemplary embodiment, the wound capacitor has been described, but the application range of the present invention is not limited to the above, and the present invention can also be applied to a capacitor having another structure, for example, a stacked capacitor or a coin capacitor.

Hereinafter, the present invention will be described in more detail based on examples, but the present invention is not limited to the examples.

Example 1

In the present example, a wound electric double layer capacitor (Φ (diameter) 18 mm×L (length) 70 mm) having a rated voltage of 2.8 V was produced as an electrochemical device. Hereinafter, a specific method for producing the electrochemical device will be described.

(Production of Electrode)

Activated carbon (88 parts by mass) as a carbon material, polytetrafluoroethylene (6 parts by mass) as a binding agent, and acetylene black (6 parts by mass) as a conductive agent were dispersed in water to prepare a slurry. The obtained slurry was applied to an aluminum (Al) foil (thickness: 30 μm), and the coating film was dried at 110° C. and rolled to form an active layer (thickness: 40 μm), thereby obtaining an electrode.

(Preparation of Electrolytic Solution)

Diethyldimethylammonium tetrafluoroborate (DEDMABF$_4$) was dissolved in γ-butyrolactone (GBL), and an additive agent was further added to the mixture to prepare an electrolytic solution. As the additive agent, α-methyl-γ-butyrolactone (AMGBL) and δ-valerolactone (DVL) were used. The concentration of DEDMABF$_4$ in the electrolytic solution was 1.0 mol/L. The content proportion of AMGBL in the electrolytic solution was 0.05 mass %. The content proportion of DVL in the electrolytic solution was 0.05 mass %.

(Production of Electrochemical Device)

A pair of electrodes were prepared, lead wires were connected to respective electrodes, and the electrodes were wound with a separator made of a cellulose nonwoven fabric interposed therebetween to form a capacitor element. The capacitor element was housed in a predetermined outer case together with an electrolytic solution, and the case was sealed with a sealing member to complete an electrochemical device (electric double layer capacitor) A1. Thereafter, an aging treatment was performed at 60° C. for 16 hours while a rated voltage was applied to the electrochemical device A1.

The electrochemical device A1 obtained above was evaluated as follows.

[Evaluation]

(Measurement of Electrostatic Capacity and Electrical Resistance Before Storage of Electrochemical Device)

Under an environment of −30° C., constant current charge was performed at a current of 1.5 A until the voltage reached 2.8 V, and then a voltage of 2.8 V was held for 7 minutes. Thereafter, constant current discharge was performed at a current of 1.35 A under an environment of −30° C. until the voltage reached 0 V.

A time t (sec) required for the voltage to drop from 2.24 V to 1.12 V in the discharge was measured. Note that 2.24 V is a voltage corresponding to 80% of 2.8 V (voltage at full charge), and 1.12 V is a voltage corresponding to 40% of 2.8 V. Using the measured time t, an electrostatic capacity C1 (F) before storage was determined from Formula (1) below.

$$\text{Electrostatic capacity } C1 = Id \times t/V \quad (1)$$

In Formula (1), Id is a current value (1.35 A) at the time of discharge, and V is a value (1.12 V) obtained by subtracting 1.12 V from 2.24 V.

Using a discharge curve (vertical axis: discharge voltage, horizontal axis: discharge time) obtained by the above discharge, a linear approximate line of the discharge curve in the range of 0.5 seconds to 2 seconds after the start of discharge was obtained, and a voltage VS of the intercept of the linear approximate line was determined. A value (V0−VS) obtained by subtracting the voltage VS from a voltage V0 at the start of discharge (when 0 second has elapsed from the start of discharge) was obtained as ΔV. Using ΔV (V) and the current value Id (1.35 A) at the time of discharge, an electrical resistance R1 (Ω) before storage was determined from Formula (2) below.

$$\text{Electrical resistance } R1 = \Delta V/Id \quad (2)$$

(Storage Test of Electrochemical Device)

Under an environment of 60° C., constant current charge was performed at a current of 1.5 A until the voltage reached 2.8 V, and then a voltage of 2.8 V was held for 1,250 hours. In this way, the electrochemical device was stored in a state where a voltage of 2.8 V was applied thereto. Thereafter, under an environment of 60° C., constant current discharge was performed at a current of 1.35 A until the voltage reached 0 V.

(Measurement of Electrostatic Capacity and Electrical Resistance after Storage of Electrochemical Device)

Thereafter, the electrochemical device was charged and discharged under an environment of −30° C. in the same manner as in the measurement of the electrostatic capacity and electrical resistance before storage. Then, an electrostatic capacity C2 (F) and an electrical resistance R2 (Ω) after storage of the electrochemical device were determined.

(Measurement of Capacitance Retention Rate and Resistance Increase Rate)

Using the electrostatic capacity C1 before storage and the electrostatic capacity C2 after storage obtained as described above, the capacitance retention rate was determined from Formula (3) below.

$$\text{Capacitance retention rate (\%)} = (\text{electrostatic capacity } C2/\text{electrostatic capacity } C1) \times 100 \quad (3)$$

Using the electrical resistance R1 before storage and the electrical resistance R2 after storage obtained as described above, the resistance increase rate was determined from Formula (4) below.

$$\text{Resistance increase rate (\%)} = (\text{electrical resistance } R2/\text{electrical resistance } R1) \times 100 \quad (4)$$

Comparative Example 1

An electrochemical device B1 of Comparative Example 1 was produced and evaluated in the same manner as in the electrochemical device A1 of Example 1 except that the additive agents (AMGBL and DVL) were not contained in the electrolytic solution.

Comparative Example 2

An electrochemical device B2 of Comparative Example 2 was produced and evaluated in the same manner as in the electrochemical device A1 of Example 1 except that DVL was not contained in the electrolytic solution.

Comparative Example 3

An electrochemical device B3 of Comparative Example 3 was produced and evaluated in the same manner as in the electrochemical device A1 of Example 1 except that AMGBL was not contained in the electrolytic solution.

The evaluation results of the electrochemical devices A1 and B1 to B3 are shown in Table 1.

TABLE 1

| | Electrolytic solution | | | | | |
| | | | Additive agent | | | |
| | | | AMGBL | DVL | Evaluation | |
| Electrochemical device | Solvent | Ionic substance | content proportion (mass %) | content proportion (mass %) | Capacitance retention rate (%) | Resistance increase rate (%) |
|---|---|---|---|---|---|---|
| A1 | GBL | $DEDMABF_4$ | 0.05 | 0.05 | 82.7 | 138.1 |
| B1 | GBL | $DEDMABF_4$ | — | — | 35.2 | 191.3 |
| B2 | GBL | $DEDMABF_4$ | 0.05 | — | 48.1 | 185.2 |
| B3 | GBL | $DEDMABF_4$ | — | 0.05 | 46.4 | 182.1 |

In the electrochemical device A1, a large capacitance retention rate and a small resistance increase rate were obtained, and the reliability was greatly improved. In the electrochemical device A1, in which both AMGBL and DVL were contained in the electrolytic solution, decomposition and deterioration of the electrolytic solution was greatly suppressed during storage in a charged state where a voltage of 2.8 V has been applied. Therefore, after storage of the electrochemical device A1, a decrease in electrostatic capacitance was suppressed, and an increase in electrical resistance was suppressed.

In the electrochemical devices B1 to B3, in which both AMGBL and DVL were not contained in the electrolytic solution, a small capacitance retention rate and a large resistance increase rate were obtained, and the reliability was deteriorated.

Examples 2 to 13

Electrochemical devices A2 to A13 of Examples 2 to 13 were produced and evaluated in the same manner as in the electrochemical device A1 of Example 1 except that the AMGBL content proportion and the DVL content proportion in the electrolytic solution were changed to the values shown in Table 2.

The evaluation results of the electrochemical devices A2 to A13 are shown in Table 2. Table 2 also shows the evaluation results of the electrochemical device A1.

TABLE 2

| | Electrolytic solution | | | | | |
| | | | Additive agent | | | |
| | | | AMGBL | DVL | Evaluation | |
| Electrochemical device | Solvent | Ionic substance | content proportion (mass %) | content proportion (mass %) | Capacitance retention rate (%) | Resistance increase rate (%) |
|---|---|---|---|---|---|---|
| A2 | GBL | $DEDMABF_4$ | 0.01 | 0.1 | 76.2 | 151.2 |
| A3 | GBL | $DEDMABF_4$ | 0.05 | 0.1 | 83.9 | 137.5 |
| A4 | GBL | $DEDMABF_4$ | 0.1 | 0.1 | 82.3 | 139.1 |

TABLE 2-continued

|  |  |  | Electrolytic solution | | | |
|---|---|---|---|---|---|---|
|  |  |  | Additive agent | | Evaluation | |
|  |  |  | AMGBL | DVL | | |
| Electrochemical device | Solvent | Ionic substance | content proportion (mass %) | content proportion (mass %) | Capacitance retention rate (%) | Resistance increase rate (%) |
| A5 | GBL | DEDMABF$_4$ | 0.5 | 0.1 | 81.1 | 141.3 |
| A6 | GBL | DEDMABF$_4$ | 1 | 0.1 | 78.6 | 143.8 |
| A7 | GBL | DEDMABF$_4$ | 3 | 0.1 | 77.6 | 144.6 |
| A8 | GBL | DEDMABF$_4$ | 3.5 | 0.1 | 76.3 | 146.5 |
| A9 | GBL | DEDMABF$_4$ | 0.05 | 0.01 | 78.9 | 150.6 |
| A1 | GBL | DEDMABF$_4$ | 0.05 | 0.05 | 82.7 | 138.1 |
| A3 | GBL | DEDMABF$_4$ | 0.05 | 0.1 | 83.9 | 137.5 |
| A10 | GBL | DEDMABF$_4$ | 0.05 | 0.5 | 82.2 | 138.9 |
| A11 | GBL | DEDMABF$_4$ | 0.05 | 1 | 81.6 | 140.2 |
| A12 | GBL | DEDMABF$_4$ | 0.05 | 3 | 81.1 | 141.3 |
| A13 | GBL | DEDMABF$_4$ | 0.05 | 3.5 | 78.9 | 143.3 |

In all of the electrochemical devices A2 to A13, a large capacitance retention rate and a small resistance increase rate were obtained.

Examples 14 to 21

In place of DEDMABF$_4$, 1-ethyl-1-methylpyrrolidinium tetrafluoroborate (EMPyBF$_4$) was used. The AMGBL content proportion and the DVL content proportion in the electrolytic solution were the values shown in Table 3. Electrochemical devices A14 to A21 of Examples 14 to 21 were produced and evaluated in the same manner as in the electrochemical device A1 of Example 1 except for the above. The evaluation results of the electrochemical devices A14 to A21 are shown in Table 3.

TABLE 3

|  |  |  | Electrolytic solution | | | |
|---|---|---|---|---|---|---|
|  |  |  | Additive agent | | Evaluation | |
|  |  |  | AMGBL | DVL | | |
| Electrochemical device | Solvent | Ionic substance | content proportion (mass %) | content proportion (mass %) | Capacitance retention rate (%) | Resistance increase rate (%) |
| A14 | GBL | EMPyBF$_4$ | 0.05 | 0.01 | 81.1 | 147.3 |
| A15 | GBL | EMPyBF$_4$ | 0.05 | 0.1 | 85.7 | 134.6 |
| A16 | GBL | EMPyBF$_4$ | 0.05 | 1 | 84.0 | 136.2 |
| A17 | GBL | EMPyBF$_4$ | 0.05 | 3 | 82.6 | 138.9 |
| A18 | GBL | EMPyBF$_4$ | 0.01 | 0.1 | 77.8 | 148.6 |
| A19 | GBL | EMPyBF$_4$ | 0.1 | 0.1 | 79.8 | 144.2 |
| A20 | GBL | EMPyBF$_4$ | 1 | 0.1 | 80.3 | 142.5 |
| A21 | GBL | EMPyBF$_4$ | 3 | 0.1 | 78.3 | 141.1 |

In all of the electrochemical devices A14 to A21, a large capacitance retention rate and a small resistance increase rate were obtained.

Examples 22 to 26

Electrochemical devices A22 to A26 of Examples 22 to 26 were produced and evaluated in the same manner as in the electrochemical device A3 of Example 3 except that the ionic substances shown in Table 4 were used in place of DEDMABF$_4$. In Table 4, TEABF$_4$ is tetraethylammonium tetrafluoroborate, TEMABF$_4$ is triethylmethylammonium tetrafluoroborate, and SBPBF$_4$ is spiro-(1,1')-bipyrrolidinium tetrafluoroborate. DMPyBF$_4$ is 1,1-dimethylpyrrolidinium tetrafluoroborate.

The evaluation results of the electrochemical devices A22 to A26 are shown in Table 4. Table 4 also shows the evaluation results of the electrochemical device A3.

TABLE 4

| Electrochemical device | Solvent | Ionic substance | Additive agent AMGBL content proportion (mass %) | Additive agent DVL content proportion (mass %) | Evaluation Capacitance retention rate (%) | Evaluation Resistance increase rate (%) |
|---|---|---|---|---|---|---|
| A3 | GBL | DEDMABF$_4$ | 0.05 | 0.1 | 83.9 | 137.5 |
| A22 | GBL | TEABF$_4$ | 0.05 | 0.1 | 83.1 | 143.5 |
| A23 | GBL | TEMABF$_4$ | 0.05 | 0.1 | 82.0 | 146.2 |
| A24 | GBL | SBPBF$_4$ | 0.05 | 0.1 | 82.5 | 144.5 |
| A25 | GBL | N-Methyl-1,4-diazabicyclo[2.2.2]octane ammonium tetrafluoroborate | 0.05 | 0.1 | 82.3 | 152.5 |
| A26 | GBL | DMPyBF$_4$ | 0.05 | 0.1 | 83.6 | 138.6 |

In all of the electrochemical devices A22 to A26, a large capacitance retention rate and a small resistance increase rate were obtained.

Examples 27 to 29

Electrochemical devices A27 to A29 of Examples 27 to 29 were produced and evaluated in the same manner as in the electrochemical devices A3, A22, and A23 of Examples 3, 22, and 23 except that acetonitrile (AN) was used in place of GBL.

Comparative Example 4

An electrochemical device B4 of Comparative Example 4 was produced and evaluated in the same manner as in the electrochemical device A3 of Example 3 except that AN was used in place of GBL and the additive agents (AMGBL and DVL) were not contained in the electrolytic solution.

Examples 30 to 32

Electrochemical devices A30 to A32 of Example 30 to 32 were produced and evaluated in the same manner as in the electrochemical devices A3, A22, and A23 of Examples 3, 22, and 23 except that propylene carbonate (PC) was used in place of GBL.

Comparative Example 5

An electrochemical device B5 of Comparative Example 5 was produced and evaluated in the same manner as in the electrochemical device A3 of Example 3 except that PC was used in place of GBL and the additive agents (AMGBL and DVL) were not contained in the electrolytic solution.

The evaluation results of the electrochemical devices A27 to A32 and B4 to B5 are shown in Table 5.

TABLE 5

| Electrochemical device | Solvent | Ionic substance | Additive agent AMGBL content proportion (mass %) | Additive agent DVL content proportion (mass %) | Evaluation Capacitance retention rate (%) | Evaluation Resistance increase rate (%) |
|---|---|---|---|---|---|---|
| A27 | AN | DEDMABF$_4$ | 0.05 | 0.1 | 85.2 | 134.2 |
| A28 | AN | TEABF$_4$ | 0.05 | 0.1 | 84.3 | 138.2 |
| A29 | AN | TEMABF$_4$ | 0.05 | 0.1 | 82.9 | 141.6 |
| B4 | AN | DEDMABF$_4$ | — | — | 65.3 | 172.2 |
| A30 | PC | DEDMABF$_4$ | 0.05 | 0.1 | 80.9 | 155.1 |
| A31 | PC | TEABF$_4$ | 0.05 | 0.1 | 78.2 | 161.8 |
| A32 | PC | TEMABF$_4$ | 0.05 | 0.1 | 76.3 | 164.2 |
| B5 | PC | DEDMABF$_4$ | — | — | 25.2 | 205.6 |

In all of the electrochemical devices A27 to A32, a large capacitance retention rate and a small resistance increase rate were obtained. In the electrochemical devices B4 to B5, in which the additive agents (AMGBL and DVL) were not contained in the electrolytic solution, a small capacitance retention rate and a large resistance increase rate were obtained.

Example 33

An electrochemical device A33 of Example 33 was produced and evaluated in the same manner as in the electrochemical device A3 of Example 3 except that a mixed solvent of AN and PC (volume ratio: 95:5) was used in place of GBL.

Example 34

An electrochemical device A34 of Example 34 was produced and evaluated in the same manner as in the electrochemical device A3 of Example 3 except that a mixed solvent of GBL and PC (volume ratio 95:5) was used in place of GBL.

Example 35

An electrochemical device A35 of Example 35 was produced and evaluated in the same manner as in the electrochemical device A3 of Example 3 except that a mixed solvent of AN and GBL (volume ratio 95:5) was used in place of GBL.

The evaluation results of the electrochemical devices A33 to A35 are shown in Table 6.

TABLE 6

| | Electrolytic solution | | Additive agent | | Evaluation | |
| --- | --- | --- | --- | --- | --- | --- |
| | | | AMGBL | DVL | | |
| Electrochemical device | Solvent | Ionic substance | content proportion (mass %) | content proportion (mass %) | Capacitance retention rate (%) | Resistance increase rate (%) |
| A33 | AN + PC (volume ratio 95:5) | DEDMABF$_4$ | 0.05 | 0.1 | 84.8 | 144.7 |
| A34 | GBL + PC (volume ratio 95:5) | DEDMABF$_4$ | 0.05 | 0.1 | 82.4 | 146.3 |
| A35 | AN + GBL (volume ratio 95:5) | DEDMABF$_4$ | 0.05 | 0.1 | 84.6 | 135.9 |

In all of the electrochemical devices A33 to A35, a large capacitance retention rate and a small resistance increase rate were obtained.

Comparative Examples 6 to 8

Electrochemical devices B6 to B8 of Comparative Examples 6 to 8 were produced and evaluated in the same manner as in the electrochemical device A3 of Example 3 except that the compounds shown in Table 7 as additive agents were used together with DVL in place of AMGBL.

Comparative Example 9

An electrochemical device B9 of Comparative Example 9 was produced and evaluated in the same manner as in the electrochemical device A3 of Example 3 except that γ-valerolactone as an additive agent was used together with AMGBL in place of DVL.

The evaluation results of the electrochemical devices B6 to B9 are shown in Table 7. Table 7 also shows the evaluation results of the electrochemical device A3. The numerical value in parentheses in the column of the additive agent in Table 7 indicates the content proportion of the additive agent in the electrolytic solution.

TABLE 7

| Electrochemical device | Electrolytic solution | | | | Evaluation | |
| --- | --- | --- | --- | --- | --- | --- |
| | Solvent | Ionic substance | Additive agent | | Capacitance retention rate (%) | Resistance increase rate (%) |
| A3 | GBL | DEDMABF$_4$ | AMGBL (0.05 mass %) | DVL (0.1 mass %) | 83.9 | 137.5 |
| B6 | GBL | DEDMABF$_4$ | α-Ethyl-γ-butyrolactone (0.05 mass %) | DVL (0.1 mass %) | 48.3 | 213.3 |
| B7 | GBL | DEDMABF$_4$ | β-Methyl-γ-butyrolactone (0.05 mass %) | DVL (0.1 mass %) | 49.3 | 195.3 |
| B8 | GBL | DEDMABF$_4$ | β-Butyrolactone (0.05 mass %) | DVL (0.1 mass %) | 47.3 | 215.3 |
| B9 | GBL | DEDMABF$_4$ | AMGBL (0.05 mass %) | γ-Valerolactone (0.1 mass %) | 47.6 | 213.7 |

In the electrochemical devices B6 to B9, in which the additive agents (AMGBL and DVL) were not contained in the electrolytic solution, a small capacitance retention rate and a large resistance increase rate were obtained.

The electrolytic solution according to the present invention is suitably used for an electrochemical device requiring high reliability.

The invention claimed is:

1. An electrolytic solution for an electrochemical device, the electrolytic solution comprising:
    a solvent;
    an ionic substance;
    α-methyl-γ-butyrolactone; and
    δ-valerolactone.

2. The electrolytic solution according to claim 1, wherein a total content proportion of the α-methyl-γ-butyrolactone and the δ-valerolactone in the electrolytic solution is less than or equal to 3.5 mass %.

3. The electrolytic solution according to claim 1, wherein the solvent contains at least one selected from the group consisting of γ-butyrolactone, acetonitrile, and propylene carbonate.

4. The electrolytic solution according to claim 1, wherein the ionic substance contains a quaternary ammonium salt.

5. The electrolytic solution according to claim 4, wherein the quaternary ammonium salt includes at least one selected from the group consisting of diethyldimethylammonium tetrafluoroborate and 1-ethyl-1-methylpyrrolidinium tetrafluoroborate.

6. An electrochemical device comprising:
    a pair of electrodes; and
    electrolytic solution according to claim 1.

7. The electrochemical device according to claim 6, wherein at least one of the pair of electrodes includes:
    an active layer containing a carbon material; and
    a current collector that supports the active layer.

8. The electrochemical device according to claim 7, wherein the carbon material includes activated carbon.

* * * * *